United States Patent
Sasama et al.

(10) Patent No.: US 7,873,287 B2
(45) Date of Patent: Jan. 18, 2011

(54) IMAGE FORMING APPARATUS ADDRESSING AN ABNORMALITY IN THE COOLING DEVICE AND A METHOD OF CONTROLLING THE IMAGE FORMING APPARATUS

(75) Inventors: Kazuo Sasama, Kawasaki (JP); Takaaki Suzuki, Sunto-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 963 days.

(21) Appl. No.: 11/694,429

(22) Filed: Mar. 30, 2007

(65) Prior Publication Data

US 2008/0240741 A1    Oct. 2, 2008

(51) Int. Cl.
G03G 15/00 (2006.01)

(52) U.S. Cl. .............................. 399/9; 399/10; 399/36; 399/88

(58) Field of Classification Search ................. 399/9, 399/10, 36, 88
See application file for complete search history.

(56) References Cited

U.S. PATENT DOCUMENTS 5,620,264 A * 4/1997 Kagita 6,185,481 B1 * 2/2001 Kondou et al.

FOREIGN PATENT DOCUMENTS

| JP | 11-134220   | 5/1999 |
|----|-------------|--------|
| JP | 2005-148669 | 6/2005 |

* cited by examiner

Primary Examiner—David M Gray
Assistant Examiner—Laura K Roth
(74) Attorney, Agent, or Firm—Turocy & Watson, LLP

(57) ABSTRACT

An image forming apparatus according to the invention includes a cooling fan as a cooling device, an image formation processing unit, a changeover unit, a main control unit, a secondary control unit, and a power supply unit. The main control unit and the secondary control unit make an appropriate action in association with each other in the event of the occurrence of an abnormality in the cooling device. The changeover unit is configured to connect the image formation processing unit to the main image formation control unit in the main control unit in a case where power is supplied to the main control unit, and to connect the image formation processing unit to the secondary image formation control unit in the secondary control unit in a case where power supply to the main control unit is stopped by the power supply control unit in the secondary control unit.

18 Claims, 12 Drawing Sheets

70

FEB. 1, 2006, AM 10:00

SERVICEMAN CALL

OUT OF ACTION DUE TO
FAILURE OF COOLING FAN

FIG. 7

IMAGE FORMING APPARATUS ADDRESSING AN ABNORMALITY IN THE COOLING DEVICE AND A METHOD OF CONTROLLING THE IMAGE FORMING APPARATUS

BACKGROUND

1. Field

The present invention relates to an image forming apparatus having a cooling device and a method of controlling the image forming apparatus.

2. Description of the Related Art

An image forming apparatus, such as a copying machine and a printer, is often provided with a cooling device, such as a cooling fan, to cool the control unit such as CPU in the apparatus. In the event of the occurrence of an abnormality in the cooling device, the CPU (control unit) is heated above the tolerance, which possibly gives damages to the CPU itself or the peripheral components or causes them to malfunction. Under these circumstances, there have been made proposals for various techniques to address an abnormality in the cooling device of this kind.

An image forming apparatus disclosed in JP-A-2005-148669 includes cooling device driving means furnished with not only the capability of driving the cooling fan, but also the capability of outputting an abnormal rotation signal of the fan to the CPU. Upon receipt of the abnormal rotation signal of the cooling fan, the control unit determines whether the cooling fan is operating normally by turning ON and OFF the power supply of the cooling fan repetitively several times. When determined as not being normal, the control unit notifies the user of the presence of an abnormality in operations of the cooling fan through the operation panel and stops the cooling fan, after which it stops the image forming operation.

An information processing apparatus disclosed in JP-A-11-134220 includes abnormality detecting means for detecting an abnormality in the cooling fan, abnormality detection signal transmitting means for transmitting an abnormality detection signal on the basis of the detection of an abnormality, and warning means for sending a warning upon receipt of the abnormality detection signal. In the event of the detection of an abnormality, the user is informed of the presence of an abnormality in operations of the cooling fan by sounding a warning and lighting ON the pilot lamp or by displaying a warning message on the operation panel having an independent power supply system by the warning means, while power supply to the apparatus is stopped except for the operation panel.

The CPU self-heats even in an idle state. Hence, it is impossible to prevent an overheating of the CPU resulting from the self-heating with a technique of subjecting the CPU to natural cooling by stopping the image forming operation like the technique disclosed in JP-A-2005-148669.

There is a case where an error, such as paper jamming, is occurring in a printer of the image forming apparatus during the occurrence of an abnormality in the cooling fan. In this case, with a technique of automatically turning OFF the power supply of the image forming apparatus at the occurrence of an abnormality in the cooling fan like the technique disclosed in JP-A-11-134220, it is impossible to notify the user of an error, such as paper jamming, that occurred during the occurrence of an abnormality in the cooling fan, because the power supply of the image forming apparatus is stopped. Hence, in a case where paper jamming had occurred, a sheet of paper is left in the image forming apparatus. This sheet of paper and toner particles fixed thereon may firmly adhere to the interior of the image forming apparatus. Such adhering materials may cause a failure of the image forming apparatus, which shortens the life of the image forming apparatus.

SUMMARY OF THE INVENTION

The present invention has been devised in view of the foregoing, and accordingly it is an object of the present invention to provide an image forming apparatus capable of addressing an abnormality in the cooling device appropriately and a method of controlling the image forming apparatus.

In order to attain the object, an image forming apparatus according to an aspect of the present invention includes: a cooling device; an image formation processing unit; a main control unit configured to be cooled by the cooling device, and including a main image formation control unit and an abnormality detecting unit, the main image formation control unit configured to control the image formation processing unit, the abnormality detecting unit configured to detect an abnormality in the cooling device; a secondary control unit including a secondary image formation control unit and a power supply control unit, the secondary image formation control unit configured to control the image formation processing unit, the power supply control unit configured to stop power supply to the main control unit in a case where the abnormality detecting unit detects the abnormality in the cooling device; and a changeover unit configured to connect the image formation processing unit to the main image formation control unit in a case where power is supplied to the main control unit and to connect the image formation processing unit to the secondary image formation control unit in a case where the power supply to the main control unit is stopped by the power supply control unit in the secondary control unit.

Further, to attain the object, a method of controlling an image forming apparatus according to another aspect of the present invention includes the steps of: detecting an abnormality in a cooling device; stopping power supply to a main control unit; and connecting an image formation processing unit to a secondary control unit with disconnecting the main control unit.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 7 is an explanatory view showing an example of serviceman call printed matter on which is printed information notifying the user of the presence of an abnormality in the cooling fan;

DETAILED DESCRIPTION

Hereinbelow, a description will be given of an image forming apparatus, and method of controlling the same, according to an embodiment of the present invention with reference to the drawings.

(1) Configuration

Figure 1:
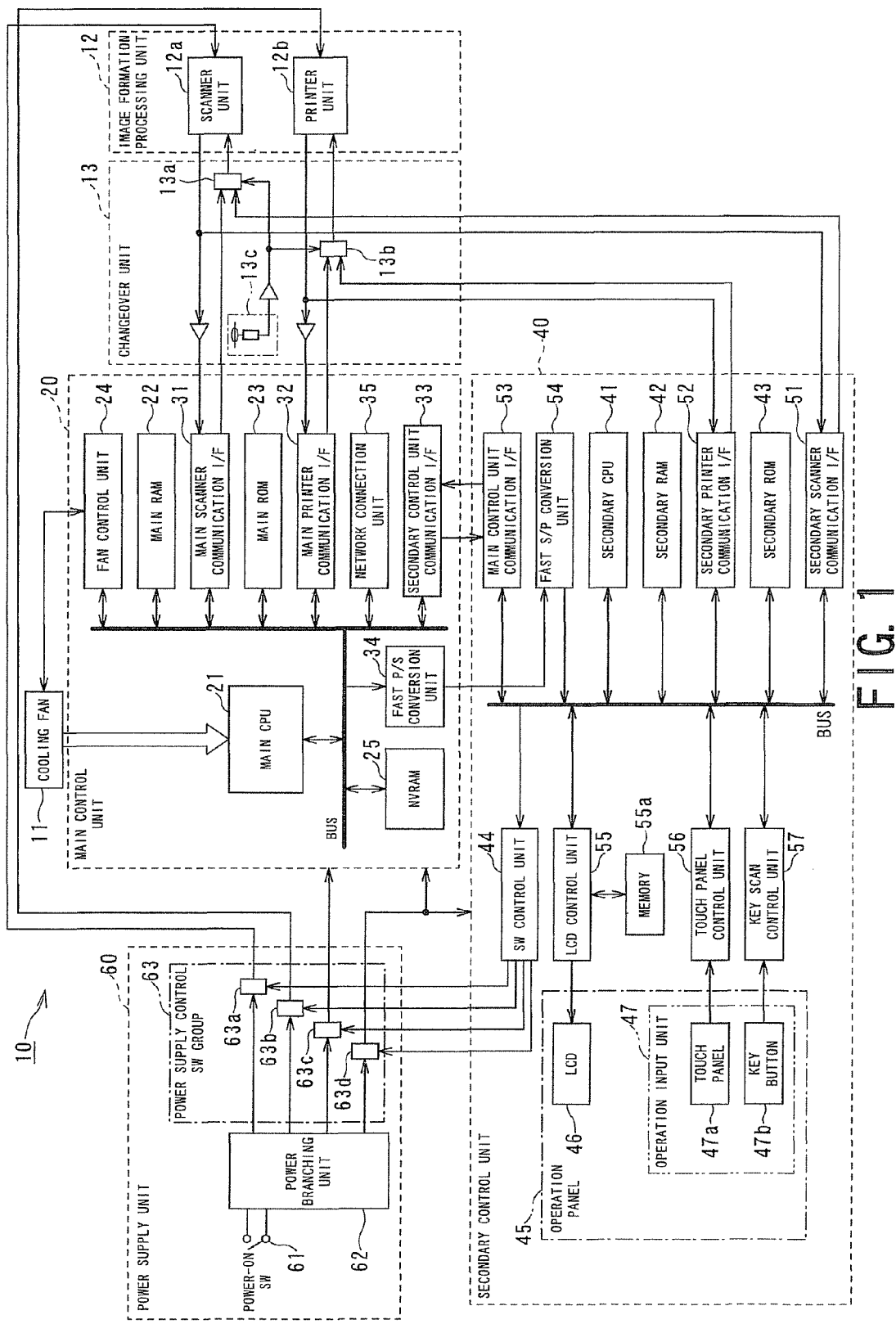
FIG. 1 is a diagram schematically showing the overall configuration of an image forming apparatus according to an embodiment of the present invention.

FIG. 1 is a diagram schematically showing the overall configuration of an image forming apparatus according to an embodiment of the present invention.

Note that with the present embodiment, a multi function peripheral furnished with a copy function, printer function, scanner function, and so forth, will be used as an example of an image forming apparatus.

An image forming apparatus 10 includes a cooling fan 11 as a cooling device, an image formation processing unit 12, a changeover unit 13, a main control unit 20, a secondary control unit 40, and a power supply unit 60.

The cooling fan 11 as a cooling device is provided adjacent to the main control unit 20. Cooling air generated in the cooling fan 11 cools a main CPU 21 by releasing heat generated in the main CPU 21 to the outside.

Also, the cooling fan 11 monitors the number of rotations of the fan, and outputs an abnormal rotation signal when there is an abnormality in the number of rotations for the abnormal rotation signal to be transmitted to the main CPU 21 via a fan control unit 24. Examples of the method of monitoring the number of rotations of the fan include a method of monitoring a current that increases and decreases in response to the number of rotations of the fan, and a method of monitoring the number of rotations by providing a member capable of outputting the number of rotations, such as a rotary encoder, and so forth.

The image formation processing unit 12 realizes various functions of a printer, copier, scanner, facsimile, and the like of the image forming apparatus 10. FIG. 1 shows an example of the configuration in which the image forming apparatus 10 is furnished with the functions of a scanner and a copier, and the image formation processing unit 12 realizes these functions in a scanner unit 12a and a printer unit 12b, respectively.

The changeover unit 13 includes a scanner communication switch 13a, a printer communication switch 13b, and a power obtaining unit 13c. The power obtaining unit 13c obtains necessary power using part of power for driving the main control unit 20, and provides the power thus obtained to the scanner communication switch 13a and the printer communication switch 13b.

The scanner communication switch 13a is configured in such a manner that in a case where necessary power is provided from the power obtaining unit 13c, it connects the scanner unit 12a in the image formation processing unit 12 to a main scanner communication I/F (Interface) 31 in the main control unit 20, and in a case where power is not provided from the power obtaining unit 13c, it connects the scanner unit 12a in the image formation processing unit 12 to a secondary scanner communication I/F 51 in the secondary control unit 40.

The printer communication switch 13b is configured in such a manner that in a case where necessary power is provided from the power obtaining unit 13c, it connects the printer unit 12b in the image formation processing unit 12 to a main printer communication I/F 32 in the main control unit 20, and in a case where power is not provided from the power obtaining unit 13c, it connects the printer unit 12b in the image formation processing unit 12 to a secondary printer communication I/F 52 in the secondary control unit 40.

The phrase, "a case where necessary power is not provided to the respective switches 13a and 13b from the power obtaining unit 13c", means a case where the power obtaining unit 13c is not able to use part of power for driving the main control unit 20. Examples of this case include a case where power supply to the main power supply unit 60 is stopped. Hence, in other words, it can be described that the changeover unit 13 is configured to connect the image formation processing unit 12 and the main control unit 20 when power is supplied to the main control unit 20, and to connect the image formation processing unit 12 and the secondary control unit 40 when power is not supplied to the main control unit 20.

The main control unit 20 includes the main CPU 21, a main RAM 22, a main ROM 23, the fan control unit 24, a nonvolatile memory unit (NVRAM: Non Volatile Random Access Memory) 25, the main scanner communication I/F 31, the main printer communication I/F 32, a secondary control unit communication I/F 33, a fast P/S conversion unit (fast parallel-to-serial conversion unit) 34, and a network connection unit 35.

The main CPU 21 controls operations of the image forming apparatus 10 according to programs stored in the main ROM 23. The main CPU 21 loads an abnormality addressing program for the main CPU 21 stored in the main ROM 23 and data necessary to run the program to the main RAM 22, and executes processing to make an appropriate action in association with the secondary control unit 40 according to the abnormality addressing program for the main CPU 21 in the event of the occurrence of an abnormality in the cooling device.

The main RAM 22 provides a work area to temporarily store the data and the programs run by the main CPU 21.

The main ROM 23 stores a start-up program of the image forming apparatus 10, a main program, the abnormality addressing program for the main CPU 21, and various kinds of data necessary to run these programs.

The non-volatile memory unit (NVRAM) 25 stores at least information (cooling fan abnormality information) informing the presence of an abnormality in the cooling fan 11. The NVRAM 25 is a non-volatile storage medium capable of retaining stored information after power supply to the main control unit 20 is stopped, and has a configuration including a storage medium readable and writable by the main CPU 21. As the NVRAM 25, a non-volatile storage medium, such as an EEPROM and a flash memory, can be used.

The network connection unit 35 is implemented with various information communication protocols corresponding to the network configuration. The network connection unit 35 connects the image forming apparatus 10 to another electric device according to the various protocols. An electrical connection via an electronic network or the like can be used as this connection. Note that the electronic network includes an information communication network in general that employs an electric communication technique. The electronic network includes, other than a LAN (Local Area Network), and the Internet network, a telephone communication line network, an optical fiber communication network, a cable communication network, a satellite communication network.

The secondary control unit 40 includes a secondary CPU 41, a secondary RAM 42, a secondary ROM 43, a switch control unit 44, an operation panel 45, the secondary scanner communication I/F 51, the secondary printer communication I/F 52, a main control unit communication I/F 53, a fast S/P conversion unit (fast serial-to-parallel conversion unit) 54, an LCD control unit 55, a touch panel control unit 56, and a key scan control unit 57.

The secondary CPU 41 controls operations of the image forming apparatus 10 according to programs stored in the secondary ROM 43. The secondary CPU 41 loads an abnormality addressing program for the secondary CPU 41 stored in the secondary ROM 43 and data necessary to run the program to the secondary RAM 42, and executes processing to make an appropriate action in association with the main control unit 20 according to the abnormality addressing program for the secondary CPU 41 in the event of the occurrence of an abnormality in the cooling device.

The secondary RAM 42 provides a work area to temporarily store the data and programs run by the secondary CPU 41.

The secondary ROM 43 stores the abnormality addressing program for the secondary CPU 41 and various kinds of data necessary to run programs. Also, the secondary ROM 43 pre-stores image data to display a notice notifying the occurrence of an error of every kind on an LCD 46.

The main ROM 23 and the secondary ROM 43 have configurations including recording media, such as a magnetic or optical recording medium or a semiconductor memory, which are at least readable by the main CPU 21 and the secondary CPU 41, respectively. As the main ROM 23 and the secondary ROM 43, a writable storage medium, such as a writable flash memory, can be used. And it may be configured in such a manner so as to download the programs and data in the main ROM 23 and the secondary ROM 43 via the electronic network, either partially or entirely.

The operation panel 45 includes the LCD 46 as a display output unit and an operation input unit 47.

The LCD 46 as the display output unit is controlled by the main CPU 21 and the secondary CPU 41 via the LCD control unit 55 to display information to operate the image forming apparatus 10 and plural keys (hereinafter, referred to as soft keys) to operate the image forming apparatus 10. Besides the LCD 46, various kinds of display, for example, a CRT display, a PDP display, and an OLED display, are well known as the display output unit, and any one of the foregoing can be used arbitrarily.

The operation input unit 47 includes a touch panel 47a and a key button 47b.

The touch panel 47a provides information about a pointed position on the touch panel 47a by the user to the main CPU 21 and the secondary CPU 41 via the touch panel control unit 56. For example, in a case where the user makes an operation to depress one of the soft keys displayed on the screen of the LCD 46, the user touches a portion corresponding to this soft key on the screen. The touch panel 47a acquires information obtained from this touching operation, for example, information about the position at which infrared rays are shielded in the case of an infrared-shielding optical touch panel 47a, as information about the pointed position by the user, and provides the information thus acquired to the main CPU 21 and the secondary CPU 41 via the touch panel control unit 56.

The key button 47b is provided in the vicinity of the touch panel 47a and the LCD 46. The key button 47b is a hard key that provides an instruction signal unique to each button to the main CPU 21 and the secondary CPU 41 via the key scan control unit 57 when the user depresses the key button 47b.

The power supply unit 60 includes a power-on switch 61, a power branching unit 62, and a power supply control switch group 63.

The power-on switch 61 is a switch that connects an power supply source (not shown), such as a commercial power supply system, to the power branching unit 62. When the power-on switch 61 is closed, the commercial power system (not shown) is connected to the power branching unit 62 and power is supplied to the power branching unit 62. The power branching unit 62 branches the power and provides branched power to the power supply control switch group 63.

The power supply control switch group 63 includes a scanner power supply control switch 63a, a printer power supply control switch 63b, a main control unit power supply control switch 63c, and a secondary control unit power supply control switch 63d. These switches 63a through 63d are switches that respectively connect the scanner unit 12a, the printer unit 12b, the main control unit 20, and the secondary control unit 40 to the power branching unit 62. The opening and closing actions of these switches 63a through 63d are controlled by the secondary control unit 40 (power supply control unit 41a) via the switch control unit 44. For example, in a case where the power-on switch 61 is closed and the main control unit power supply control switch 63c is also closed, the main control unit 20 becomes an operable state as power is supplied thereto.

Hence, the secondary control unit 40 stops power supply to the main control unit 20 by opening the main control unit power supply control switch 63c via the switch control unit 44.

The commercial power system as the power supply source is not necessarily required. Any power supply source is available as long as it is capable of stopping and starting power supply to the image forming apparatus 10 in association with the opening and closing actions of the power-on switch 61, and for example, the power supply unit 60 may be configured so as to use a power generating device, such as a fuel cell.

In this embodiment, assume that these switches 63a through 63d are closed in a normal state.

Figure 2:
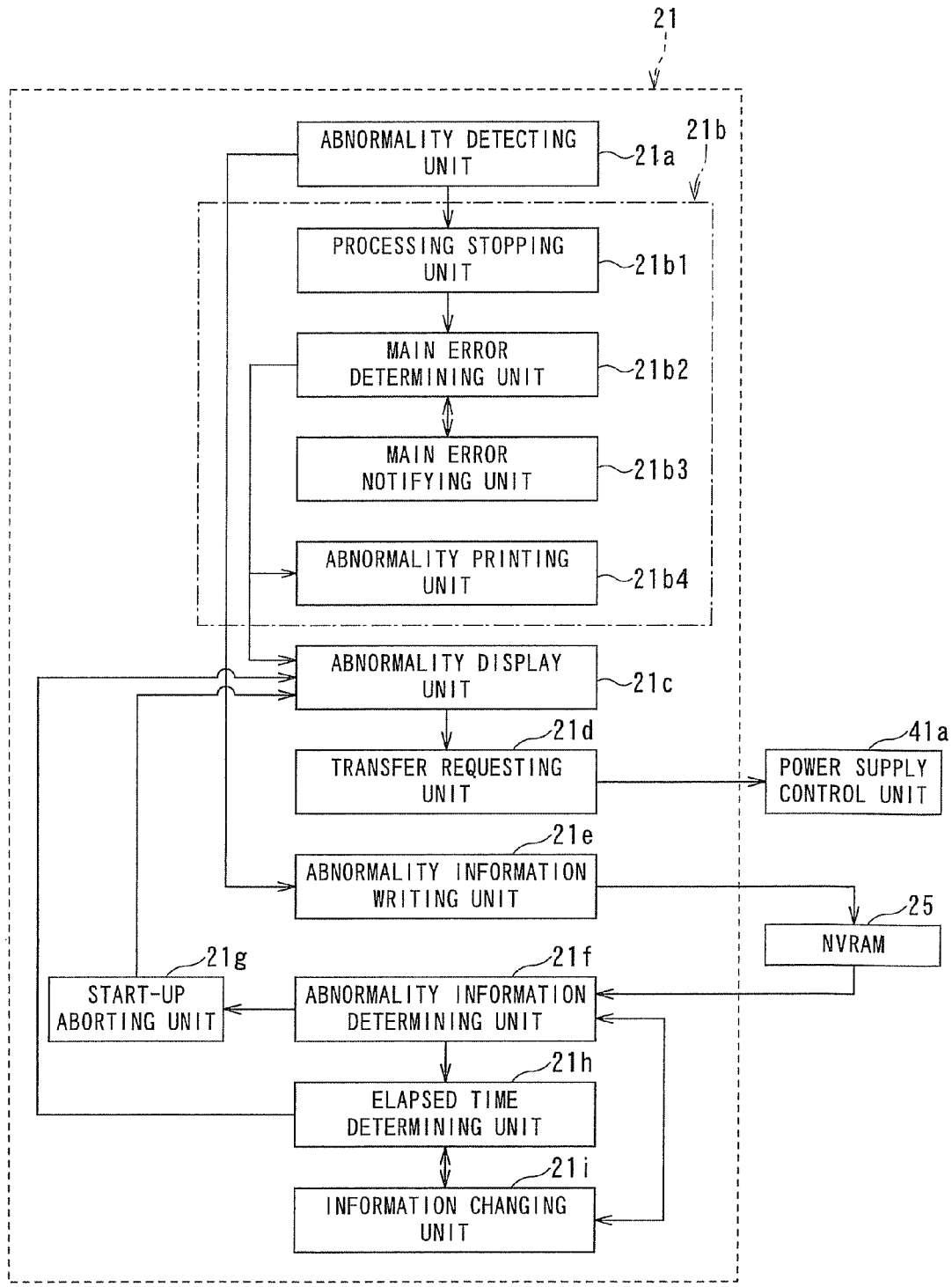
FIG. 2 is a block diagram schematically showing an example of the configuration of units of a main CPU.

FIG. 2 is a block diagram schematically showing an example of the configuration of units of the main CPU 21 shown in FIG. 1. The units may be formed of hardware, such as circuits, instead of using the main CPU 21.

The main CPU 21 functions at least as an abnormality detecting unit 21a, a main image formation control unit 21b, an abnormality display unit 21c, a transfer requesting unit 21d, an abnormality information writing unit 21e, an abnormality information determining unit 21f, a start-up aborting unit 21g, an elapsed time determining unit 21h, and an information changing unit 21i according to the abnormality addressing program for the main CPU 21. The respective units 21a through 21i use a required work area in the main RAM 22 as a temporary data storage space.

The respective units 21a through 21i in the main CPU 21 will now be described.

The abnormality detecting unit 21a determines whether it has received an abnormal rotation signal transmitted from the cooling fan 11 via the fan control unit 24, and in a case where the abnormal rotation signal has been received, it provides a processing stopping unit 21b1 with information informing the presence of an abnormality in the cooling fan 11.

There may be a case where the cooling fan 11 is provided with a rotary encoder and configured so as to be able to output the number of rotations of the fan. In this case, it may be configured in such a manner that the abnormality detecting unit 21a receives the number of rotations of the fan via the fan control unit 24 and determines the presence of an abnormality in the cooling fan 11 when the number of rotations becomes equal to or smaller than a required number of rotations prestored in the main ROM 23.

The main image formation control unit 21b has the processing stopping unit 21b1, a main error determining unit 21b2, a main error notifying unit 21b3, and an abnormality printing unit 21b4.

Upon receipt of the information informing the presence of an abnormality in the cooling fan 11 from the abnormality detecting unit 21a, the processing stopping unit 21b1 communicates with the scanner unit 12a via the main scanner communication I/F 31 and with the printer unit 12b via the main printer communication I/F 32 to instruct the scanner unit 12a and the printer unit 12b to suspend the processing being executed.

The main error determining unit 21b2 determines whether an error is occurring in the image formation processing unit 12. In this embodiment, the phrase, "an error is occurring in the image formation processing unit 12", means, for example, an event that at least one of the following errors is occurring: jamming of original documents the user wishes to be scanned (original document jamming), jamming of sheets of printing paper (paper jamming), a shortage of sheets of printing paper (empty paper), and a shortage of toner particles (empty toner).

The main error notifying unit 21b3 makes the LCD 46 display information informing the presence of an error in the image formation processing unit 12 via the LCD control unit 55. To be more concrete, the main error notifying unit 21b3 transfers image data to display information informing the presence of an error to the secondary control unit 40 via the fast P/S conversion unit 34 in the form of serial data at a high speed. The image data is converted to parallel data in a fast S/P conversion unit 54 and stored in a memory (LCD memory) 55a equipped to the LCD control unit 55. When the image data is stored in the LCD memory 55a, the main error notifying unit 21b3 controls the LCD 46 via the LCD control unit 55 to output and display the image data on the LCD 46. Alternatively, the image data may be stored in the secondary RAM 42 or the secondary ROM 43 (it should be noted, however, that this alternative is limited to a case where the secondary ROM 43 is formed of a writable medium).

The abnormality printing unit 21b4 controls the printer unit 12b via the main printer communication I/F 32 to output (discharge on a paper discharge tray) printed matter (serviceman call printed matter) 70 on which is printed information informing the presence of an abnormality in the cooling fan 11.

The abnormality display unit 21c stores image data to display a serviceman call image informing the presence of an abnormality in the cooling fan 11 on the LCD 46 in the LCD memory 55a, and makes the LCD 46 display the image data thereon.

In this embodiment, information (serviceman call printing information) informing the presence of an abnormality in the cooling fan 11 printed on the serviceman call print matter 70, and the serviceman call image referred to herein, specify information to stop operations of the image forming apparatus 10 because of the presence of an abnormality in the cooling fan 11, information about the date and time of the abnormality occurrence, and information informing that a serviceman should be called.

The transfer requesting unit 21d provides the secondary CPU 41 with the information informing that the control on the image formation processing unit 12 is transferred to the secondary CPU 41 via the secondary control unit communication I/F 33 and the main control unit communication I/F 53.

The abnormality information writing unit 21e writes the information (cooling fan abnormality information) informing the presence of an abnormality in the cooling fan 11 into the NVRAM 25.

The abnormality information determining unit 21f determines whether the cooling fan abnormality information has been stored in the NVRAM 25.

The start-up aborting unit 21g receives information informing that the cooling fan abnormality information has been stored in the NVRAM 25 from the abnormality information determining unit 21f, and aborts the start-up of the image forming apparatus 10.

The elapsed time determining unit 21h determines whether a required time has elapsed since the start-up of the image forming apparatus 10 started. The required time is set to stop power supply to the main CPU 21 swiftly when there is an abnormality in the cooling fan 11. The required time is prestored in the NVRAM 25 according to the specification or an instruction from the user. This embodiment will describe a case where 60 sec is set as this required time.

The information changing unit 21i changes the setting information (including the cooling fan abnormality information) of the image forming apparatus 10 stored in the NVRAM 25 in response to a change request to the NVRAM 25 from the user.

Figure 3:
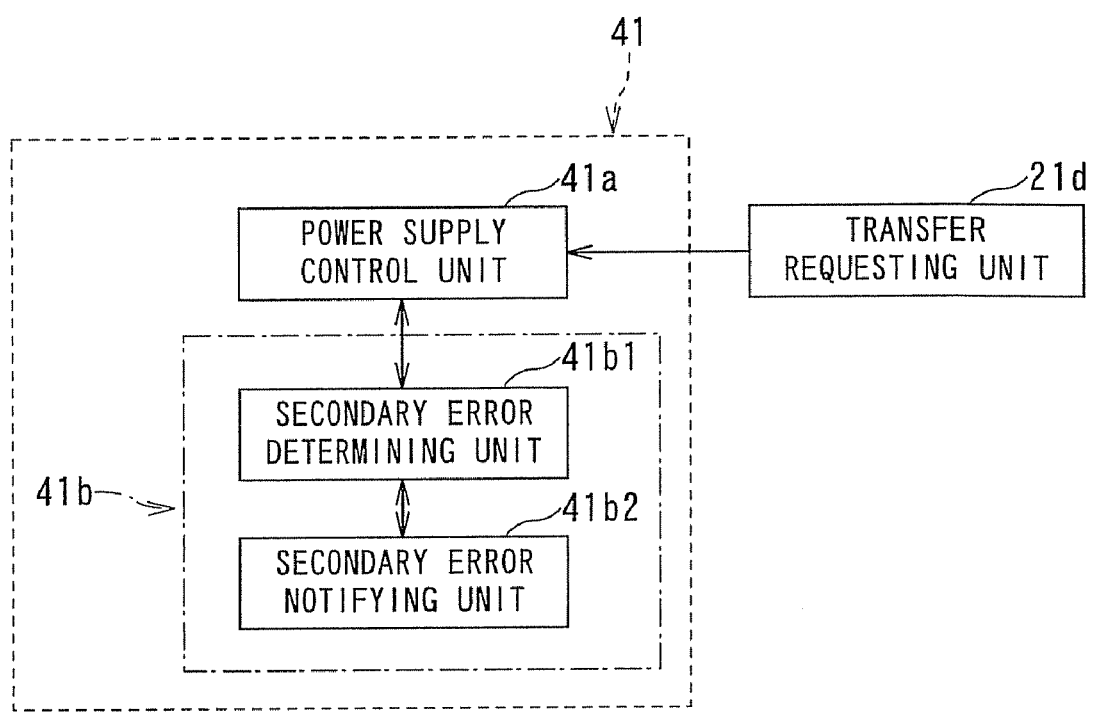
FIG. 3 is a block diagram schematically showing an example of the configuration of units of a secondary CPU.

FIG. 3 is a block diagram schematically showing an example of the configuration of units of the secondary CPU 41 shown in FIG. 1. The units may be formed of hardware, such as circuits, instead of using the secondary CPU 41.

The secondary CPU 41 functions at least as a power supply control unit 41a and a secondary image formation control unit 41b according to the abnormality addressing program for the secondary CPU 41. The respective units 41a and 41b use a required work area in the secondary RAM 42 as a temporary data storage space.

The respective units 41a and 41b in the secondary CPU 41 will now be described.

In a case where the power supply control unit 41a receives the information informing that the control on the image formation processing unit 12 is transferred to the secondary CPU 41 from the transfer requesting unit 21d in the main CPU 21, it opens the main control unit power supply control switch 63c via the switch control unit 44. In addition, in a case where the power supply control unit 41a receives the information informing that all the errors in an image processing unit are removed from a secondary error determining unit 41b1, the power supply control unit 41a opens the power supply control switch of the scanner unit 12a and the power supply control switch of the printer unit 12b via the switch control unit 44.

The secondary image formation control unit 41b has the secondary error determining unit 41b1 and a secondary error notifying unit 41b2.

The secondary error determining unit 41b1 determines whether an error is occurring in the image formation processing unit 12.

The secondary error notifying unit 41b2 makes the LCD 46 display an image indicating whether an error is occurring in the image formation processing unit 12 via the LCD control unit 55. Also, the secondary error notifying unit 41b2 deletes this image from the LCD 46.

(2) Operations

An example of operations of the image forming apparatus 10 according to this embodiment will now be described.

Figure 4:
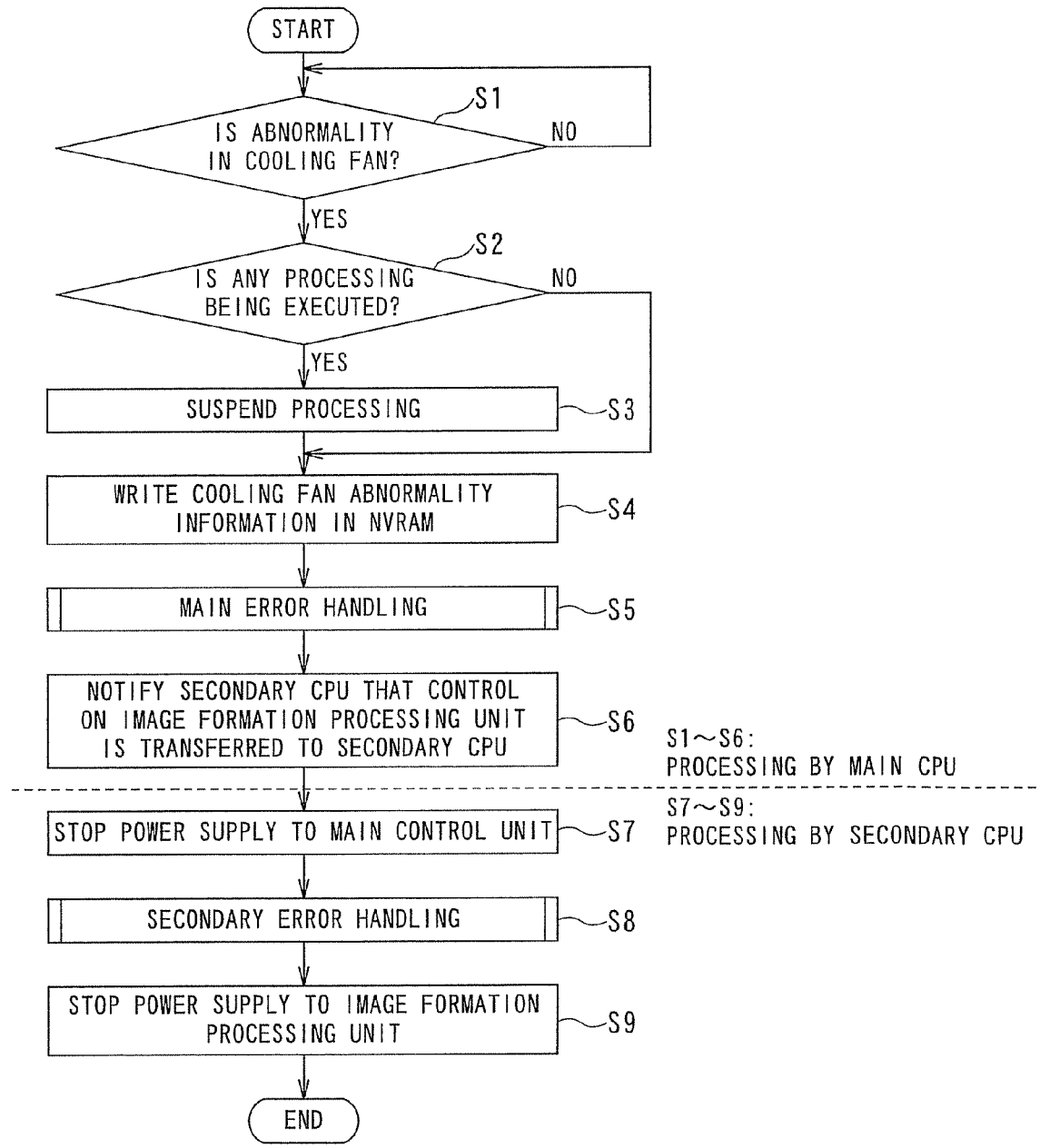
FIG. 4 is a flowchart showing an example of the procedure to prevent thermal destruction of the main CPU by stopping power supply to the main CPU swiftly in the event of the occurrence of an abnormality in a cooling fan by the main CPU and the secondary CPU, and to remove an error that remains after power supply to the main CPU is stopped, such as paper jamming, by the secondary CPU.

FIG. 4 is a flowchart showing an example of the procedure to prevent thermal destruction of the main CPU 21 by stopping power supply to the main CPU 21 swiftly in the event of the occurrence of an abnormality in the cooling fan 11 by the main CPU 21 and the secondary CPU 41 in the image forming apparatus 10 shown in FIG. 1, and procedure to remove an error that remains after power supply to the main CPU 21 is stopped, such as paper jamming, by the secondary CPU 41. In FIG. 4, numerals labeled with a capital S indicate the respective steps of the flowchart.

This procedure starts when power is supplied to the respective units in the image forming apparatus 10 as the power-on switch 61 is closed and the changeover unit 13 connects the main control unit 20 to the image formation processing unit 12.

Initially, in Step S1, the abnormality detecting unit 21a determines whether it has received an abnormal rotation signal transmitted from the cooling fan 11 via the fan control unit 24. In a case where the abnormal rotation signal has been received, the abnormality detecting unit 21a outputs information informing the presence of an abnormality in the cooling fan 11 to the processing stopping unit 21b1, and the flow proceeds to Step S2. Meanwhile, in a case where the abnormal rotation signal has not been received, it continues to monitor in determining whether the abnormal rotation signal has been received.

Subsequently, in Step S2, the processing stopping unit 21b1 communicates with the scanner unit 12a via the main scanner communication I/F 31 and with the printer unit 12b via the main printer communication I/F 32, and determines whether any processing using the scanner function or the printer function is being executed. In a case where the processing is being executed, the flow proceeds to Step S3. Meanwhile, in a case where no such processing is being executed, the flow proceeds to Step S4.

Subsequently, in Step S3, the processing stopping unit 21b1 communicates with the scanner unit 12a via the main scanner communication I/F 31 and with the printer unit 12b via the main printer communication I/F 32, and instructs the scanner unit 12a and the printer unit 12b to suspend the processing being executed. Upon receipt of this suspending instruction, the scanner unit 12a and the printer unit 12b swiftly suspends the processing.

In this embodiment, the phrase, "suspend the processing by the image formation processing unit 12", means an action by which the image formation processing unit 12 rejects to execute new processing after it has completed processing in a series of steps that is currently executed. For example, in a case where the printer unit 12b is executing printer output processing, it rejects to execute new processing and ejects a sheet of paper being carried.

However, there is a case where an error, such as paper jamming, occurs while the processing is suspended. Generally, in a case where an error, such as paper jamming, is occurring in the image forming apparatus 10, it is configured in such a manner that power supply to the main CPU 21 is not stopped unless this error is removed. This is because when power supply to the main CPU 21 is stopped, there is no way to know the state of the image formation processing unit 12. Hence, when an error is occurring, power supply to the main CPU 21 is continued, which may possibly give rise to thermal destruction of the main CPU 21.

In the image forming apparatus 10 of this embodiment, in order to prevent thermal destruction of the main CPU 21, even when an error is occurring after the cooling fan 11 is stopped, power supply to the main CPU 21 is stopped swiftly by the procedure in subsequent Steps S4 through S7.

In Step S4, the abnormal information writing unit 21e writes information informing the presence of an abnormality in the cooling fan 11 into the NVRAM 25. The cooling fan abnormality information is used by the main CPU 21 when the power-on switch 61 is turned on again.

Subsequently, in Step S5, the main CPU 21 determines whether an error is occurring in the image formation processing unit 12, and in a case where an error is occurring, it makes the LCD 46 display such information thereon. In the error handling (main error handling) by the main CPU 21 in Step S5, the main CPU 21 does not wait for the error in the image formation processing unit 12 to be removed so as to reduce the load on the main CPU 21 to the extent possible.

Subsequently, in Step S6, the transfer requesting unit 21d provides the secondary CPU 41 with the information informing that the control on the image formation processing unit 12 is transferred to the secondary CPU 41 via the secondary control unit communication I/F 33 and the main control unit communication I/F 53.

Subsequently, in Step S7, the power supply control unit 41a in the secondary CPU 41 receives the information informing that the control on the image formation processing unit 12 is transferred to the secondary CPU 41 from the transfer requesting unit 21d in the main CPU 21, and opens the main control unit power supply control switch 63c via the switch control unit 44. Consequently, because power supply to the main control unit 20 including the main CPU 21 is stopped, power supply to the main CPU 21 is stopped. As power supply to the main control unit 20 is stopped, the changeover unit 13 opens the connection between the image formation processing unit 12 and the main control unit 20, and connects the image formation processing unit 12 and the secondary control unit 40.

Note that the step of writing the information informing the presence of an abnormality in the cooling fan 11 into the NVRAM 25 in Step S4 can be executed at any timing as long as it is executed after Step S1 and before Step S7.

According to the procedure described above, even in a case where an error is occurring, it is possible to stop power supply to the main CPU 21 swiftly without waiting for the error to be removed.

However, when the state where an error is not removed is left unattended, there may be a risk of leaving a factor that may cause a failure of the image forming apparatus 10, for example, a sheet of paper that is left inside the image formation processing unit 12. In the image forming apparatus 10 of this embodiment, even after power supply to the main CPU 21 is stopped, an error in the image formation processing unit 12 is removed by the secondary CPU 41.

In Step S8, the secondary CPU 41 determines whether an error is occurring in the image formation processing unit 12, and in a case where an error is occurring, it makes the LCD 46 display information informing as such. In the error handling (secondary error handling) by the secondary CPU 41 in Step S8, the secondary CPU 41 repetitively performs an error determination for the image formation processing unit 12 and displays the occurrence of an error until all the errors in the image formation processing unit 12 are removed. According to processing in Step S8, even after power supply to the main CPU 21 is stopped, it is possible to remove all the errors, such as paper jamming, by the secondary CPU 41.

Subsequently, in Step S9, the power supply control unit 41a opens the scanner power supply control switch 63a and the printer power supply control switch 63b via the switch control unit 44. Consequently, power is supplied only to the secondary control unit 40 including the LCD 46 that displays an error.

According to the procedure described above, not only is it possible to prevent thermal destruction by stopping power supply to the main CPU 21 swiftly in the event of the occurrence of an abnormality in the cooling fan 11 by the main CPU 21 and the secondary CPU 41 in the image forming apparatus 10, but it is also possible to remove an error that remains after power supply to the main CPU 21 is stopped, such as paper jamming, by the secondary CPU 41.

(3) Operation (Processing by Main CPU 21)

Next, the following will describe the procedure by which whether an error is occurring in the image formation processing unit 12 is determined by the main CPU 21, and in a case where an error is occurring, the LCD 46 is made display information informing as such, and in a case where an error is not occurring, processing to perform serviceman call printing is executed (main error handling is executed).

Figure 5:
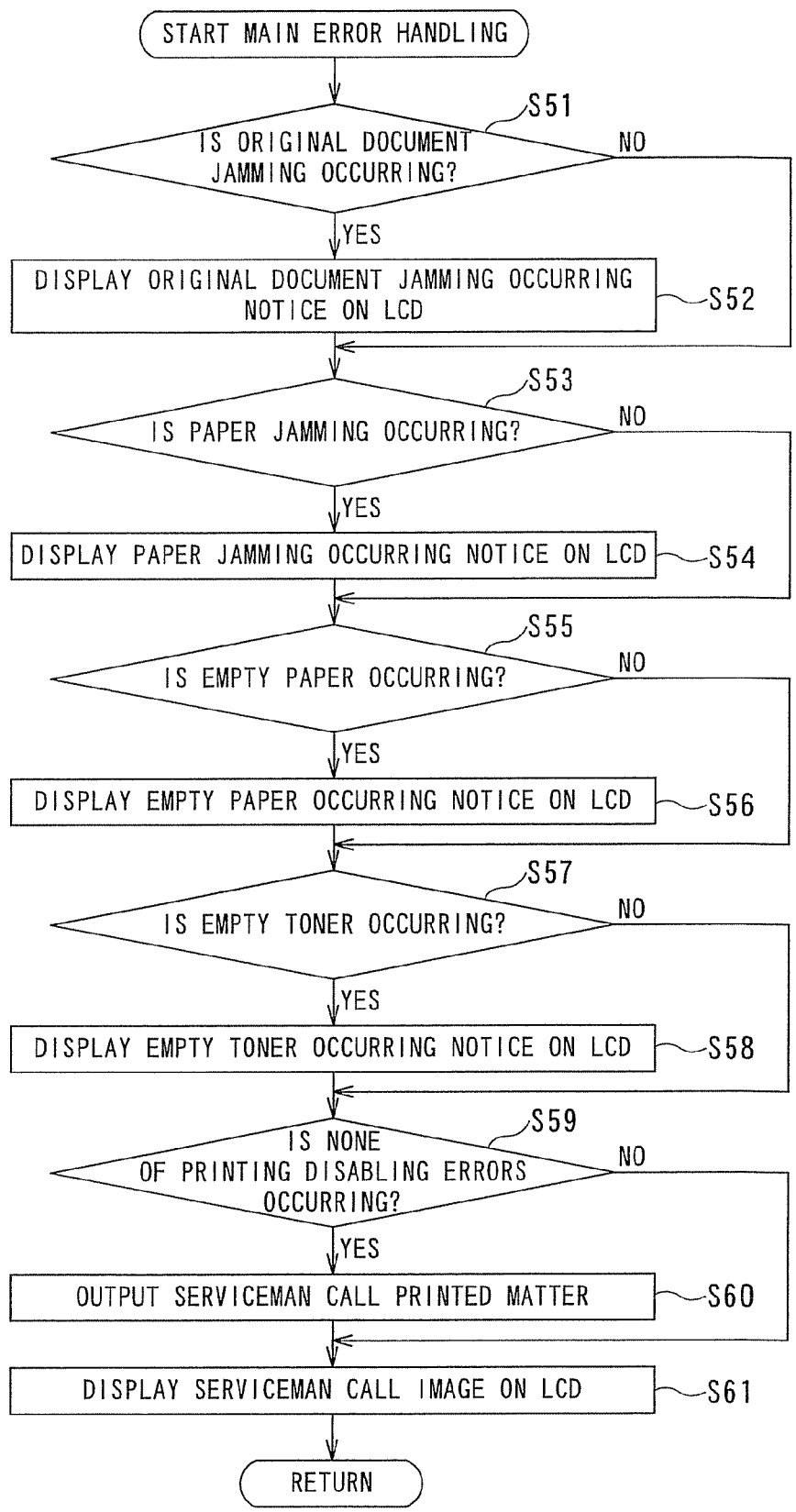
FIG. 5 is a subroutine flowchart showing an example of the procedure of main error handling executed by the main CPU in Step S5 of FIG. 4.

FIG. 5 is a subroutine flowchart showing an example of the procedure of the main error handling executed by the main CPU 21 in Step S5 of FIG. 4. In FIG. 5, numerals labeled with a capital S indicate the respective steps of the flowchart.

In Step S51, the main error determining unit 21b2 determines whether original document jamming is occurring. In a case where original document jamming is occurring, it writes information informing as such in a required work area in the main RAM 22 by setting up the flag indicating the occurrence of original document jamming, and provides the main error notifying unit 21b3 with information specifying the portion where the original document jamming is occurring, after which the flow proceeds to Step S52. Meanwhile, in a case where original document jamming is not occurring, the flow proceeds to Step S53.

Figure 6:
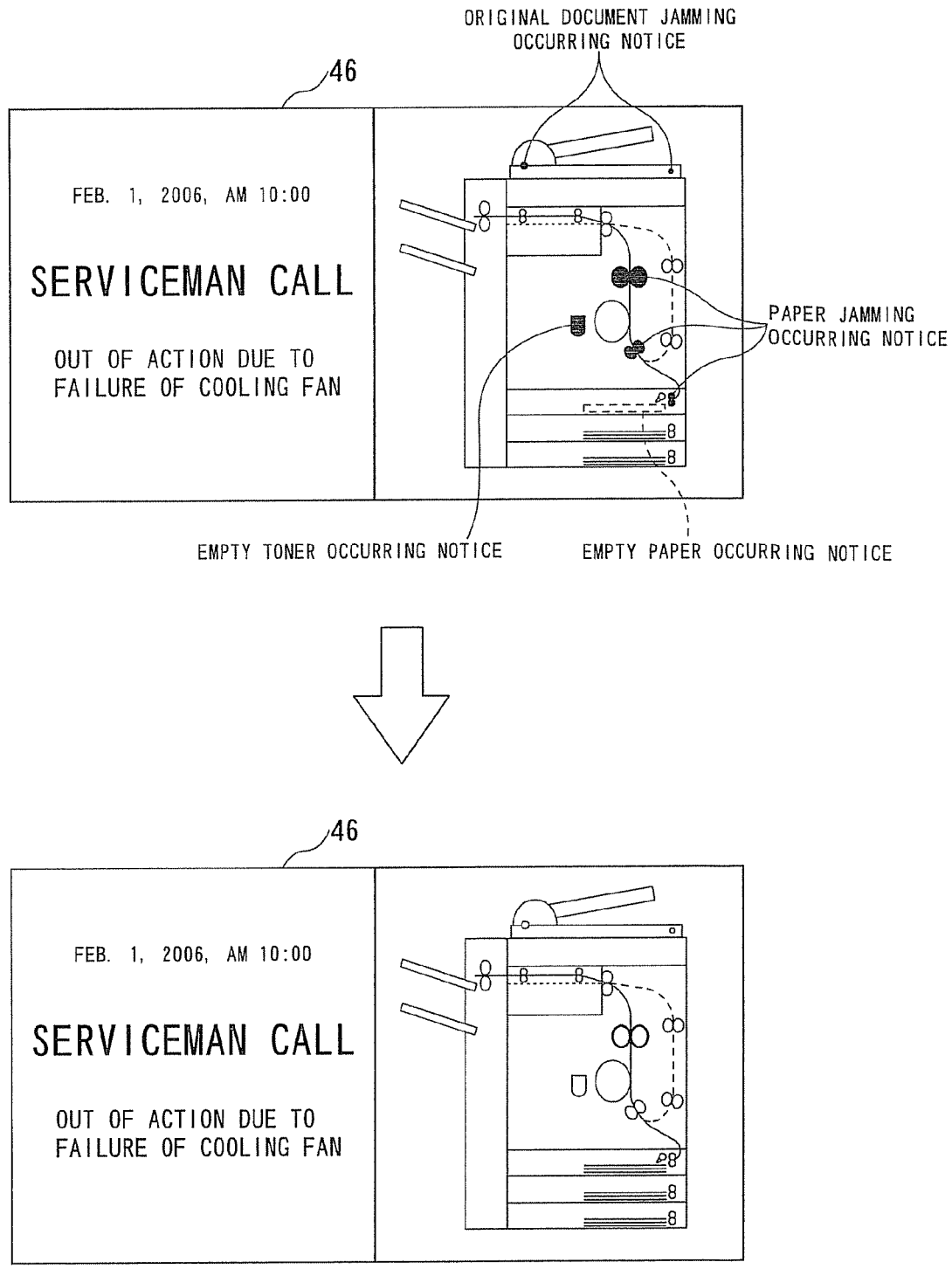
FIG. 6 is an explanatory view showing an example in a case where an error occurring notice in the image formation processing unit is displayed on the right half of an LCD and a serviceman call image indicating the presence of an abnormality in the cooling fan is displayed on the left half of the LCD.

FIG. 6 is an explanatory view showing an example in a case where an error occurring notice of the image formation processing unit 12 is displayed on the right half of the LCD 46 and a serviceman call image informing the presence of an abnormality in the cooling fan 11 is displayed on the left half of the LCD 46.

In the upper right of FIG. 6, portions filled in black specify the portions where, of all the errors in the image formation processing unit 12, original document jamming, paper jamming, and empty toner are occurring. In a case where there is no such error, as is shown in the lower right of FIG. 6, these portions are shown as an outline. A rectangular portion indicated by a broken line specifies the portion where empty paper is occurring. In a case where an error of the empty paper is not occurring, plural straight lines are shown in this portion.

In Step S52, the main error notifying unit 21b3 receives information specifying the portion where the original document jamming is occurring from the main error determining unit 21b2, and stores data of an image notifying the user of the portion where the original document jamming is occurring into the LCD memory 55a while making the LCD 46 display this image thereon (see FIG. 6).

In Step S53, the main error determining unit 21b2 determines whether paper jamming is occurring. In a case where paper jamming is occurring, it writes information informing as such into a required work area in the main RAM 22 by setting up the flag indicating the occurrence of paper jamming and provides the main error notifying unit 21b3 with information specifying the portion where the paper jamming is occurring, after which the flow proceeds to Step S54. Meanwhile, in a case where paper jamming is not occurring, the flow proceeds to Step S55.

Subsequently, in Step S54, the main error notifying unit 21b3 receives the information specifying the portion where the paper jamming is occurring from the main error determining unit 21b2, and stores data of an image notifying the user of the portion where the paper jamming is occurring into the LCD memory 55a while making the LCD 46 display this image thereon (see FIG. 6).

In Step S55, the main error determining unit 21b2 determines whether empty paper is occurring. In a case where empty paper is occurring, it writes information informing as such in a required work area in the main RAM 22 by setting up the flag indicating the occurrence of empty paper, and provides the main error notifying unit 21b3 with information specifying the portion where the empty paper is occurring, after which the flow proceeds to Step S56. Meanwhile, in a case where empty paper is not occurring, the flow proceeds to Step S57.

Subsequently, in Step S56, the main error notifying unit 21b3 receives the information specifying the portion where the empty paper is occurring from the main error determining unit 21b2, and stores data of an image notifying the user of the portion where the empty paper is occurring into the LCD memory 55a while making the LCD 46 display this image thereon (FIG. 6).

In Step S57, the main error determining unit 21b2 determines whether empty toner is occurring. In a case where empty toner is occurring, it writes information informing as such in a required work area in the main RAM 22 by setting up the flag indicating the occurrence of empty toner, and provides the main error notifying unit 21b3 with information specifying the portion where the empty toner is occurring, after which the flow proceeds to Step S58. Meanwhile, in a case where toner empty is not occurring, the flow proceeds to Step S59.

Subsequently, in Step S58, the main error notifying unit 21b3 receives the information specifying the portion where the empty toner is occurring from the main error determining unit 21b2, and stores data of an image notifying the user of the portion where the empty toner is occurring into the LCD memory 55a while making the LCD 46 display this image thereon (see FIG. 6).

Subsequently, in Step S59, the main error determining unit 21b2 makes a final determination as to whether an error interfering with printing (printing disabling error) is occurring by referring to the required work area in the main RAM 22. In this embodiment, the term, "the printing disabling error", means paper jamming, empty paper, and empty toner. Because original document jamming is not an error interfering with printing, it is excluded from the printing disabling error. In a case where none of these printing disabling errors is occurring, the flow proceeds to Step S60 to print out the information informing the presence of an abnormality in the cooling fan 11. Meanwhile, in a case where at least any one of these printing disabling errors is occurring, the flow proceeds to Step S61 because printing is not enabled.

FIG. 7 is an explanatory view showing an example of the serviceman call printed matter 70 on which is printed the information notifying the user of the presence of an abnormality in the cooling fan 11 (serviceman call printing information).

In Step S60, the abnormality printing unit 21b4 controls the printer unit 12b via the main printer communication I/F 32 to output (discharge onto the paper discharge tray) the serviceman call printed matter 70 on which is printed the serviceman call printing information (including at least the information informing the presence of an abnormality in the cooling device) (see FIG. 7). By seeing the serviceman call printed matter 70, the user becomes able to understand the presence of an abnormality in the cooling fan 11.

Subsequently, in Step S61, the abnormality display unit 21c stores into the LCD memory 55a image data used to display the serviceman call image (including at least the information informing the presence of an abnormality in the cooling device) on the LCD 46, and makes the LCD 46 display thereon the serviceman call image indicating the presence of an abnormality in the cooling fan 11 (see FIG. 6). The procedure of the main error handling in a series of steps executed by the main CPU 21 thus ends and the flow proceeds to Step S6 of FIG. 4.

According to the procedure in Steps S51 through S61 described above, the main CPU 21 determines whether an error is occurring in the image formation processing unit 12, and in a case where an error is occurring, it makes the LCD 46 display the information informing as such and in a case where an error is not occurring, it further executes processing to perform the serviceman call printing (main error handling).

(4) Operation (Processing by Secondary CPU 41)

Next, the following will describe the procedure when executing processing (secondary error handling) by which whether an error is occurring in the image formation processing unit 12 is determined by the secondary CPU 41, and in a case where an error is occurring, it makes the LCD 46 display thereon information informing as such and changes the display on the LCD 46 in response to the removal of the error.

Figure 8:
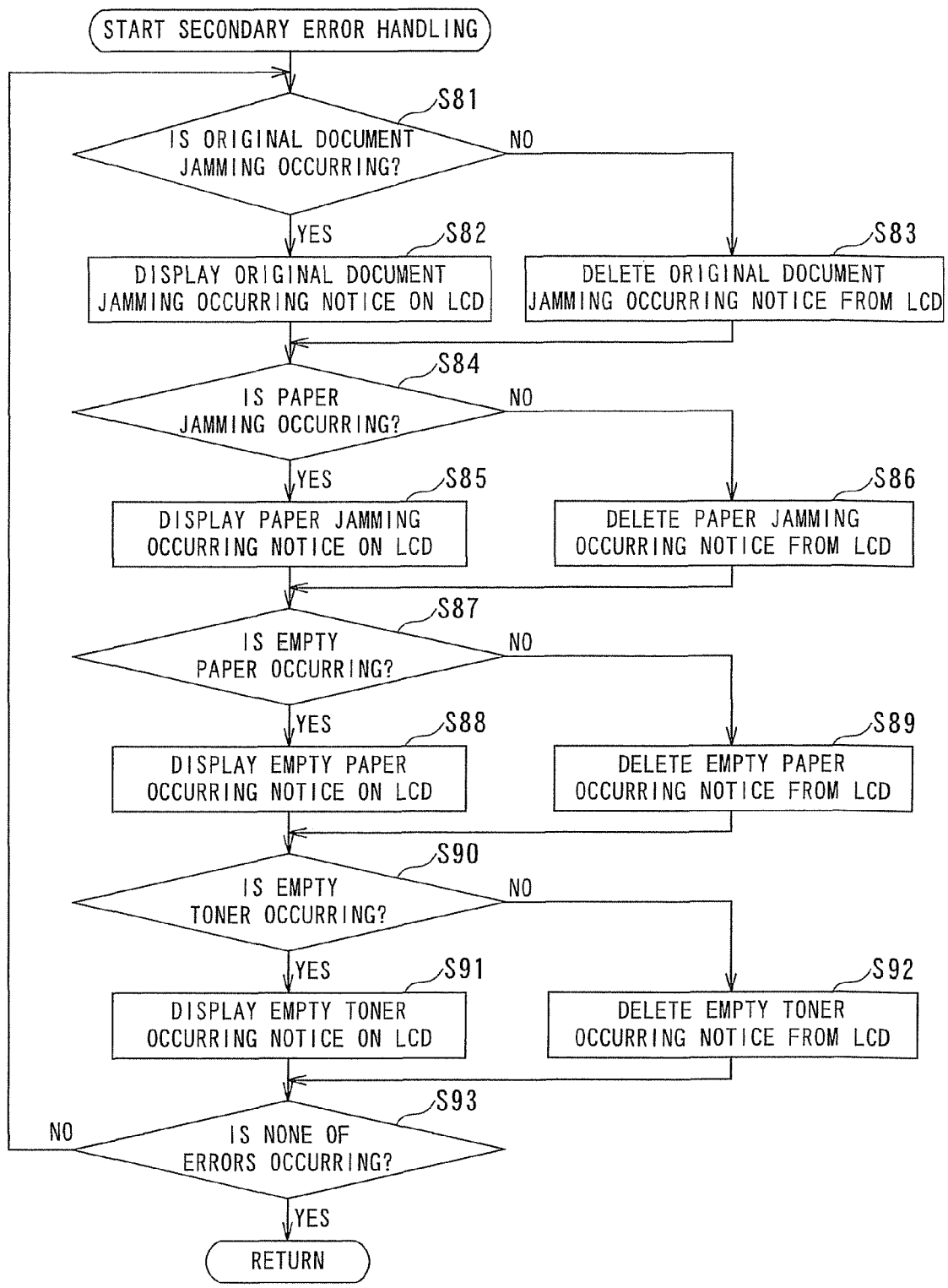
FIG. 8 is a subroutine flowchart showing an example of the procedure of secondary error handling executed by the secondary CPU in Step S8 of FIG. 4.

FIG. 8 is a subroutine flowchart showing an example of the procedure of the secondary error handling executed by the secondary CPU 41 in Step S8 of FIG. 4. In FIG. 8, numerals labeled with a capital S denote the respective steps of the flowchart.

Note that power supply to the main control unit 20 is stopped before this procedure begins. This procedure is performed after Step S5 of FIG. 4 (Step S51 through S61 of FIG. 5). Hence, the image data (final image data) of the image displayed last on the LCD 46 (see FIG. 6) by the main error notifying unit 21b3 and the abnormality display unit 21c has been stored in the LCD memory 55a. The secondary CPU 41 makes the LCD 46 continue to display the image as shown in FIG. 6 using the final image data even after power supply to the main control unit 20 is stopped.

In addition, image data necessary to add a change to the final image data is pre-stored in a recording medium readable by the secondary CPU 41, for example, the secondary RAM 42, the secondary ROM 43 or the LCD memory 55a. This embodiment will describe a case where the image data necessary to vary the final image data is pre-stored in the secondary ROM 43.

In Step S81, the secondary error determining unit 41b1 determines whether original document jamming is occurring. In a case where original document jamming is occurring, it writes information informing as such in a required work area in the secondary RAM 42 by setting up the flag indicating the occurrence of original document jamming, and provides the secondary error notifying unit 41b2 with information specifying the portion where the original document jamming is occurring, after which the flow proceeds to Step S82. Meanwhile, in a case where original document jamming is not occurring, the flow proceeds to Step S83.

Subsequently, in Step S82, the secondary error notifying unit 41b2 reads out the data of the image notifying the user of the portion where the original document jamming is occurring from the secondary ROM 43, and superimposes the image data thus read on the final image data, after which it makes the LCD 46 display thereon the image notifying the user of the portion where the original document jamming is occurring (see FIG. 6).

Meanwhile, in Step S83, the secondary error notifying unit 41b2 deletes the information informing the presence of the original document jamming from the LCD 46 to show the corresponding portion as an outline (see FIG. 6). The user thus becomes able to understand that the original document jamming occurring in the outlined portion is now removed.

In Step S84, the secondary error determining unit 41b1 determines whether paper jamming is occurring. In a case where paper jamming is occurring, it writes information informing as such in a required work area in the secondary RAM 42 by setting up the flag indicating the occurrence of paper jamming, and provides the secondary error notifying unit 41b2 with information specifying the portion where the paper jamming is occurring, after which the flow proceeds to Step S85. Meanwhile, in a case where paper jamming is not occurring, the flow proceeds to Step S86.

Subsequently, in Step S85, the secondary error notifying unit 41b2 reads out data of an image notifying the user of the portion where the paper jamming is occurring from the secondary ROM 43, and superimposes the image data thus read on the final image data, after which it makes the LCD 46 display thereon the image notifying the user of the portion where the paper jamming is occurring (see FIG. 6).

Meanwhile, in Step S86, the secondary error notifying unit 41b2 deletes the information informing the presence of paper jamming from the LCD 46 to show the corresponding portion as an outline (see FIG. 6). The user thus becomes able to understand that the paper jamming occurring in the outlined portion is now removed.

In Step S87, the secondary error determining unit 41b1 determines whether empty paper is occurring. In a case where empty paper is occurring, it writes information informing as such in a required work area in the secondary RAM 42 by setting up the flag indicating the occurrence of empty paper, and provides the secondary error notifying unit 41b2 with information specifying the portion where the empty paper is occurring, after which the flow proceeds to Step S88. Meanwhile, in a case where empty paper is not occurring, the flow proceeds to Step S89.

Subsequently, in Step S88, the secondary error notifying unit 41b2 reads out the data of an image notifying the user of the portion where the empty paper is occurring from the secondary ROM 43, and superimposes the image data thus read on the final image data, after which it makes the LCD 46 display thereon the image notifying the user of the portion where the empty paper is occurring (see FIG. 6).

Meanwhile, in Step S89, the secondary error notifying unit 41b2 deletes the information informing the presence of the empty paper from the LCD 46 and displays plural straight lines instead (see FIG. 6). The user thus becomes able to understand that the empty paper occurring in the portion where plural straight lines are displayed is now removed.

In Step S90, the secondary error determining unit 41b1 determines whether empty toner is occurring. In a case where empty toner is occurring, it writes information informing as such in a required work area in the secondary RAM 42 by setting up the flag indicating the occurrence of empty toner, and provides the secondary error notifying unit 41b2 with information specifying the portion where the empty toner is occurring, after which the flow proceeds to Step S91. Meanwhile, in a case where empty toner is not occurring, the flow proceeds to Step S92.

Subsequently, in Step S91, the secondary error notifying unit 41b2 reads out data of the image notifying the user of the portion where the empty toner is occurring from the secondary ROM 43 and superimposes the image data thus read on the final image data, after which it makes the LCD 46 display thereon the image notifying the user of the portion where the empty toner is occurring (see FIG. 6).

Meanwhile, in Step S92, the secondary error notifying unit 41b2 deletes the information informing the presence of empty toner from the LCD 46 to show the corresponding portion as an outline (see FIG. 6). The user thus becomes able to understand that the empty toner occurring in the outlined portion is now removed.

Subsequently, in Step S93, the secondary error determining unit 41b1 makes a final determination as to whether an error is occurring in the image formation processing unit 12 by referring to the required work area in the secondary RAM 42. In a case where none of the errors is occurring at all, the procedure of the secondary error handling in a series of steps executed by the secondary CPU 41 ends, and the flow proceeds to Step S9 of FIG. 4. Meanwhile, in a case at least one error is occurring, the flow returns to Step S81.

According to the procedure in Steps S81 through S93, whether any error is occurring in the image formation processing unit 12 is determined by the secondary CPU 41, and in a case where an error is occurring, not only is it possible to make the LCD 46 display thereon the information informing as such, but it is also possible to execute processing to change the display on the LCD 46 in response to the removal of the error.

It should be noted that in Steps S83, S86, S89, and S92, when the secondary error notifying unit 41b2 makes a notification as to the removal of an error of every kind, it may read out data of an image notifying the user of the portion where the error is removed (an image in which the removed portion is shown as an outline) from the secondary ROM 43 to superimpose the image data thus read on the final image data.

The display image on the LCD 46 shown in FIG. 8 is created according to the final image data stored in the LCD memory 55a. Hence, as the image data that needs to be stored in the secondary ROM 43 and the LCD memory 55a, it is sufficient to store image data specifying the portion where an error of every kind is occurring and the portion where the error is removed. This makes it possible to use a ROM and an LCD memory 55a having a small capacity as those used in the operation panel 45 in the related art as the secondary ROM 43 and the LCD memory 55a.

(5) Operation (At the Start-Up of Image Forming Apparatus 10)

Figure 9:
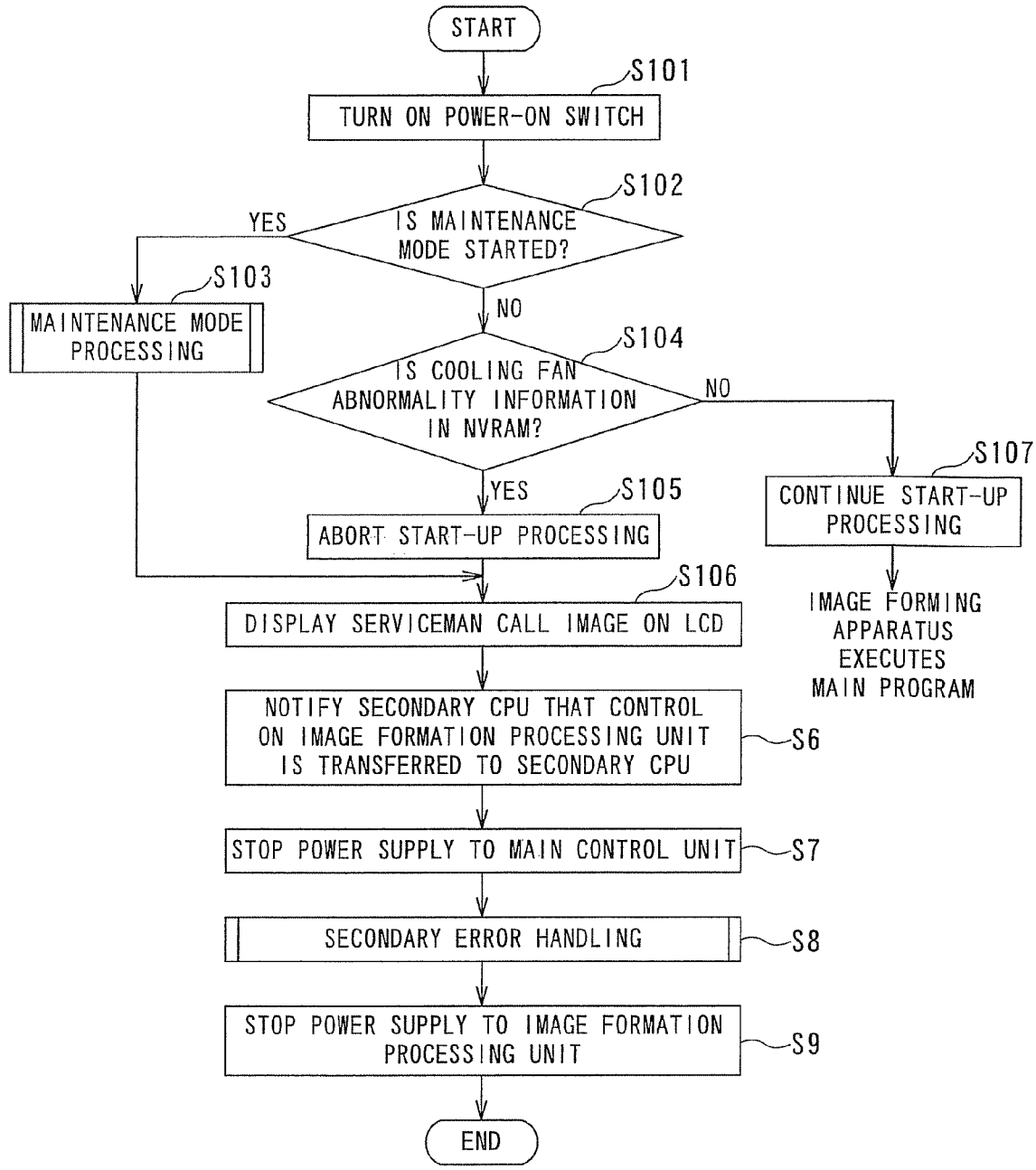
FIG. 9 is a flowchart showing the procedure to stop power supply to the main CPU swiftly so as to prevent the main CPU from being applied an excessive load in a case where there is an abnormality in the cooling fan at the start-up of the image forming apparatus.

FIG. 9 is a flowchart showing the procedure to stop power supply to the main CPU 21 swiftly so as to prevent the main CPU 21 from being applied an excessive load in a case where there is an abnormality in the cooling fan 11 at the start-up of the image forming apparatus 10. In FIG. 9, numerals labeled with a capital S denote the respective steps of the flowchart. Steps same as those in FIG. 4 are labeled with the same numerals and description of such steps are not repeated herein.

Initially, in Step S101, the power-on switch 61 is closed according to an instruction from the user. Consequently, the scanner unit 12a and the printer unit 12b in the image formation processing unit 12 start initialization independently, and start processing to shift to the stand-by state.

Subsequently, in Step S102, whether the maintenance mode is started is determined. In a case where the maintenance mode is started, the flow proceeds to Step S103. Meanwhile, in a case where it is the normal start-up, the flow proceeds to Step S104.

The maintenance mode referred to herein means a state where a confirmation or a change is allowed for the information of various settings in the image forming apparatus 10 (including the cooling fan abnormality information). In this embodiment, an example in a case where only such confirmation and change are allowed in the maintenance mode will be described. In this case, it should be noted that in order to allow the shifting to the normal start-up after the maintenance mode is started, the power supply of the image forming apparatus 10 is turned off once (the power-on switch is opened), after which the power supply of the image forming apparatus 10 is turned on again (the power-on switch is closed) for the normal start-up to take place.

In Step S103, the main CPU 21 confirms and changes the settings stored in the NVRAM 25 in the maintenance mode (executes the maintenance mode processing).

Meanwhile, in Step S104, the abnormality information determining unit 21f determines whether the cooling fan abnormality information is stored in the NVRAM 25. In a case where the cooling fan abnormality information is stored, the flow proceeds to Step S105. Meanwhile, in a case where such information is not stored, the flow proceeds to Step S107.

Subsequently, in Step S105, the start-up aborting unit 21g aborts the start-up of the image forming apparatus 10.

Subsequently, in Step S106, the abnormality display unit 21c stores into the LCD memory 55a the image data to display the serviceman call image indicating the presence of an abnormality in the cooling fan 11 on the LCD 46, and makes the LCD 46 display thereon the serviceman call image indicating the presence of an abnormality in the cooling fan 11 (see FIG. 6), after which the flow proceeds to Step S6.

Meanwhile, in Step S107, the main CPU 21 continues the normal start-up processing of the image forming apparatus 10 because there is no abnormality in the cooling fan 11, after which the main program of the image forming apparatus 10 is executed.

According to the procedure shown in FIG. 9, in a case where there is an abnormality in the cooling fan 11 at the start-up of the image forming apparatus 10, it is possible to stop power supply to the main CPU 21 swiftly without applying an excessive load on the main CPU 21.

Figure 10:
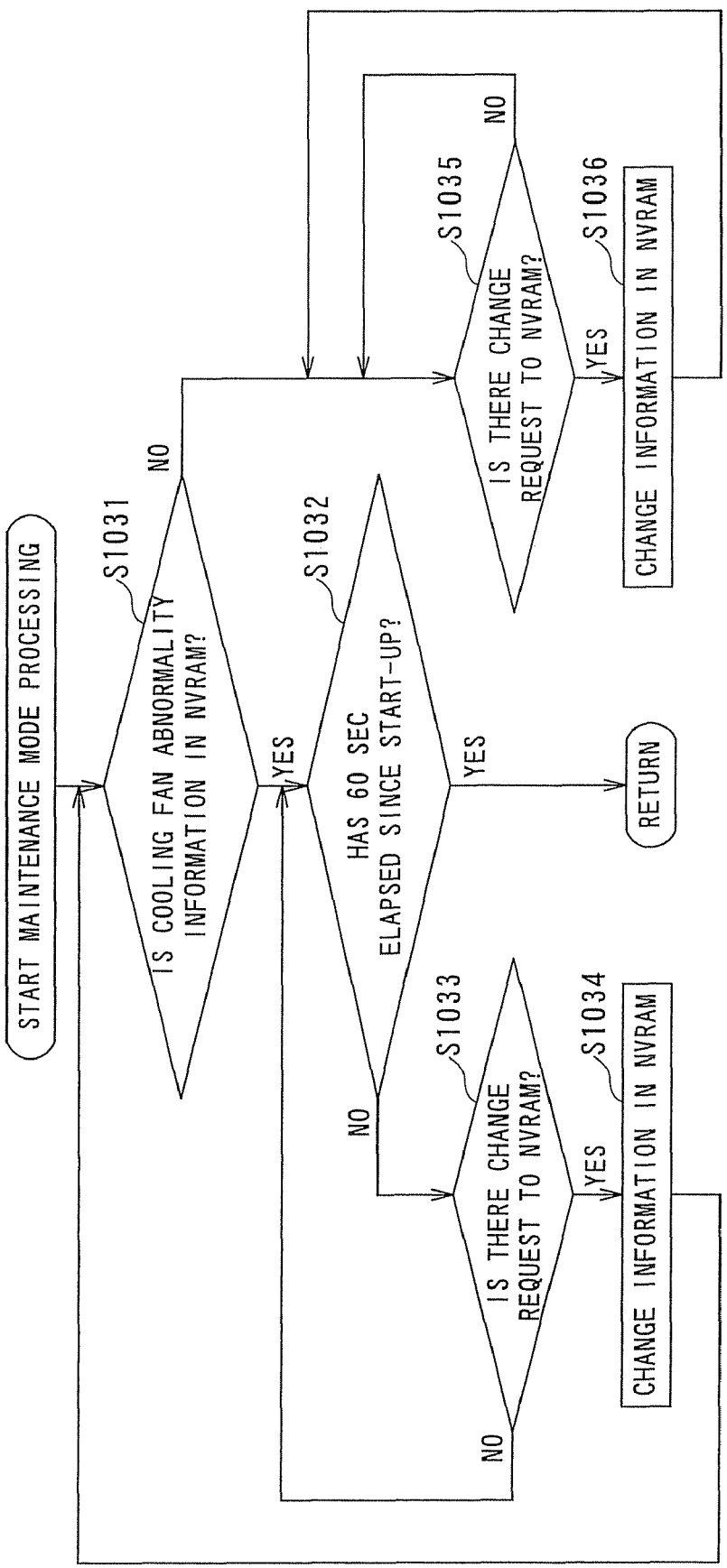
FIG. 10 is a subroutine flowchart showing an example of the procedure of the processing in a series of steps in a maintenance mode (maintenance mode processing) corresponding to the occurrence of an abnormality in the cooling fan executed by the main CPU in Step S103 of FIG. 9.

FIG. 10 is a subroutine flowchart showing an example of the procedure of the processing in a series of the steps in the maintenance mode (maintenance mode processing) corresponding to the occurrence of an abnormality in the cooling fan 11 executed by the main CPU 21 in Step S103 of FIG. 9. In FIG. 10, numerals labeled with a capital S denote the respective steps of the flowchart.

The maintenance mode processing is the processing to execute normal maintenance mode processing in a case where the cooling fan abnormality information is not stored in the NVRAM 25 and to stop power supply to the main CPU 21 swiftly in a case where the cooling fan abnormality information is stored and the cooling fan abnormality information is not deleted within a specific time after the start-up of the image forming processing apparatus.

In Step S1031, the abnormality information determining unit 21*f* determines whether the cooling fan abnormality information is stored in the NVRAM 25. In a case where the cooling fan abnormality information is stored, the flow proceeds to Step S1032. Meanwhile, in a case where such information is not stored, the flow proceeds to Step S1035.

Subsequently, in Step S1032, the elapsed time determining unit 21*h* determines whether 60 sec have elapsed since the start-up of the image forming apparatus 10 was started. In a case where the elapsed time since the start-up was started has not reached 60 sec, the flow proceeds to S1033 to continue the maintenance mode processing. In a case where an elapsed time has reached 60 sec or greater, the flow proceeds to Step S106 of FIG. 9 to stop power supply to the main CPU 21 swiftly, and the maintenance mode processing in a series of the steps ends.

Subsequently, in Step S1033, the information changing unit 21*i* determines whether there is a change request to the NVRAM 25 from the user via the operation input unit 47. In a case where there is a change request, the flow proceeds to Step S1034. Meanwhile, in a case where there is no such request, the flow returns to Step S1032.

Subsequently, in Step S1034, the information changing unit 21*i* changes the setting information (including the cooling fan abnormality information) of the image forming apparatus 10 stored in the NVRAM 25 in response to a change request to the NVRAM 25 from the user, and the flow returns to Step S1031.

For example, in a case where the abnormality in the cooling fan 11 is removed, for example, by replacing the cooling fan 11 with a new one, the user makes a request in Step S1033 to delete the cooling fan abnormality information stored in the NVRAM 25. In this case, the information changing unit 21*i* deletes the cooling fan abnormality information from the NVRAM 25 in response to a request from the user in Step S1034.

Meanwhile, in a case where it is determined that there is no cooling fan abnormality information in Step S1031, the information changing unit 21*i* determines whether there is a change request to the NVRAM 25 from the user via the operation input unit 47 in Step S1035. In a case where there is a change request, the flow proceeds to Step S1036. Meanwhile, in a case where there is no such request, it continues to determine whether there is a change request.

Subsequently, in Step S1036, the information changing unit 21*i* changes the setting information (including the cooling fan abnormality information) of the image forming apparatus 10 stored in the NVRAM 25 in response to a change request to the NVRAM 25 from the user, and the flow returns to Step S1035.

Steps S1035 and S1036 are the processing executed in the maintenance mode in a case where there is no abnormality in the cooling fan 11. This embodiment shows an example in a case where it is impossible to shift directly from the maintenance mode to the normal start-up. Hence, in order to shift from the processing in Steps S1035 and S1036 to the normal start-up, the power supply of the image forming apparatus 10 has to be turned OFF once (the power-on switch 61 is opened). The maintenance mode processing in a series of steps ends by turning OFF the power supply of the image forming apparatus 10.

According to the procedure described above, it is possible to execute the maintenance mode processing addressing the occurrence of an abnormality in the cooling fan 11.

(6) Operation (Serviceman Call Printed Matter 70)

Figure 11:
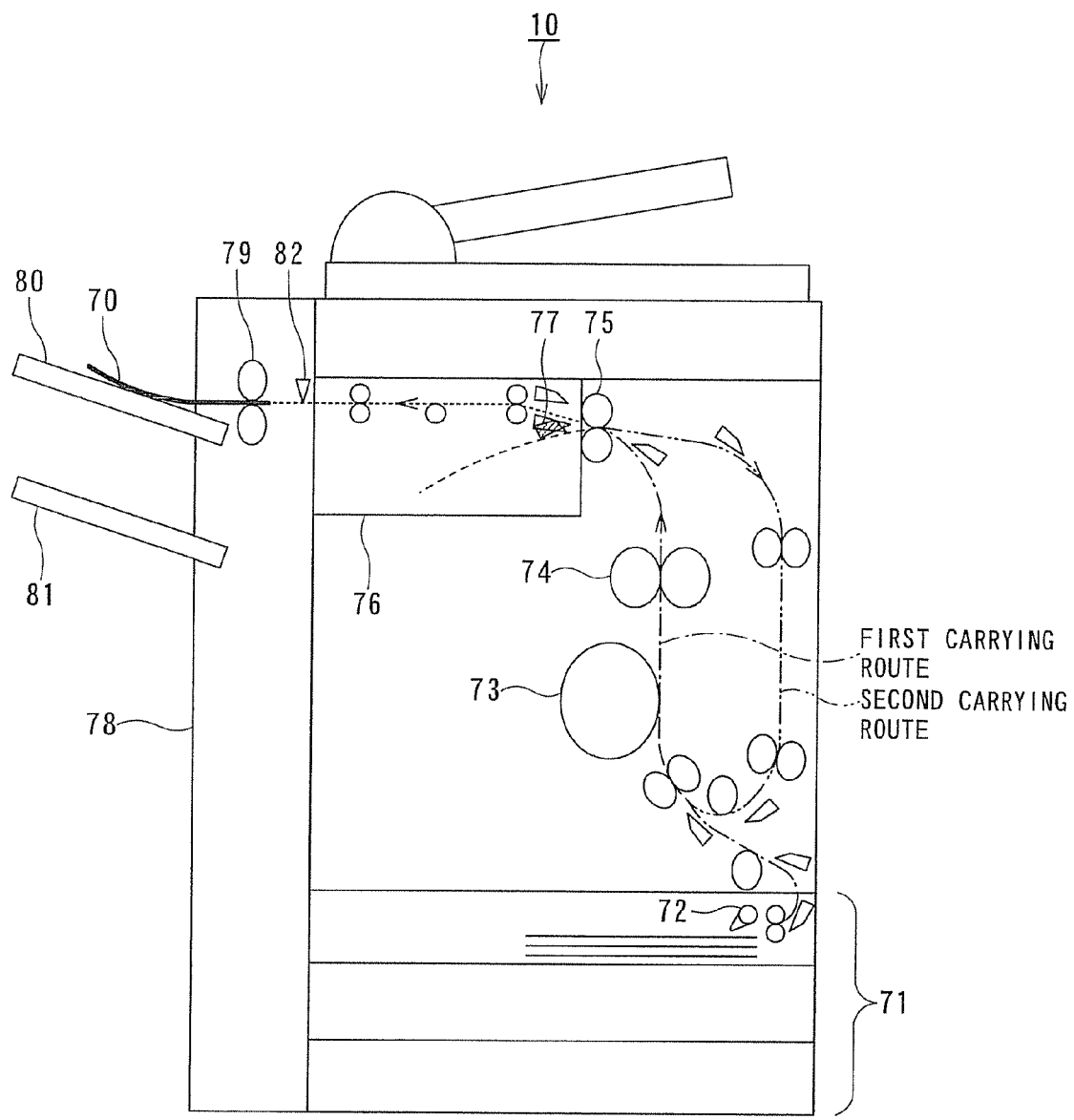
FIG. 11 is an example of a longitudinal cross section of the image forming apparatus used to describe carrying routes of serviceman call printed matter outputted by an abnormality printing unit.

FIG. 11 is an example of a longitudinal cross section of the image forming apparatus 10 to describe carrying routes of the serviceman call printed matter 70 outputted from the abnormality printing unit 21*b*4.

The serviceman call printed matter 70 is outputted to notify the user of the presence of an abnormality in the cooling fan 11. Hence, for the user to confirm the print content easily, it is preferable that the serviceman call printed matter 70 is outputted (discharged) on the paper discharge tray with the printed surface being face up. Further, in order to prevent the serviceman call printed matter 70 from being missing, it is more preferable to configure in such a manner that a paper discharge unit (second paper discharge rollers 79 of FIG. 11) adjacent to the paper discharge tray holds the serviceman call printed matter 70.

Firstly, the following will describe an example of the procedure to output printed matter with the printed surface being face up, by inverting the printed matter within the image forming apparatus 10 for the image forming apparatus 10 in a case where the image forming apparatus 10 is configured to normally discharge printed matter on the paper discharge tray with the printed surface being face down. As a technique of inverting printed matter inside the image forming apparatus 10, the double-side printing technique as a known art can be used.

Initially, a sheet of paper loaded on a paper feeding tray 71 is sent to a normal carrying route (first carrying route) indicated by an alternate long and short dash line shown in FIG. 11 by a pick-up roller 72.

This sheet of paper then passes by a fixing device 74 following a photoconductive drum 73, and is made into the serviceman call printed matter 70 as the serviceman call printing information (including at least information informing the presence of an abnormality in the cooling device) is printed thereon (see FIG. 7).

Subsequently, the serviceman call 70 passes by first paper discharge rollers 75. The first paper discharge rollers 75 inverts the rotating direction before the serviceman call printed matter 70 is completely outputted to a body-inside paper discharge tray 76. In this instance, a paper carrying guide 77 is located at the hatched position in FIG. 11, and the serviceman call printed matter 70 is sent to the position indicted by a broken line in FIG. 11. The serviceman call printed matter 70 is thus sent to a second carrying route indicated by a chain double-dashed line in FIG. 11.

Subsequently, the serviceman call printed matter 70 is sent to the first carrying route again, and passes by the fixing device 74 following the photoconductive drum 73. In this instance, the serviceman call printed matter 70 is turned over from the state when it passed through the first carrying route for the first time. It should be noted that when it passes through the first carrying route for the second time, printing is executed in neither the photoconductive drum 73 nor the fixing device 74.

Subsequently, the serviceman call printed matter 70 passes through the first paper discharge rollers 75 again. In this instance, the paper carrying guide 77 has moved to the position indicated without being hatched in FIG. 11, and introduces the serviceman call printed matter 70 to a route indicated by a dotted line in FIG. 11 (a route to be sent to the finisher).

The serviceman call printed matter 70 is then outputted to a first paper discharge tray 80 by way of the second paper discharge rollers 79 inside the finisher. The paper discharge tray on which is outputted the serviceman call printed matter 70 may be a second paper discharge tray 81; however, the first paper discharge tray 80 (the paper discharge tray provided at the uppermost stage) is more preferable. This is because the visibility for the user is increased in a paper discharge tray provided at the uppermost stage.

The following will describe an example of the procedure to have the serviceman call printed matter 70 be held by being pinched by the paper discharge unit (paper discharge rollers 79) adjacent to the paper discharge tray in order to prevent the serviceman call printed matter 70 from being missing.

In order to prevent the serviceman call printed matter 70 from being missing, it is configured in such a manner that part of the serviceman call printed matter 70 is held by the second paper discharge rollers 79 as is shown in FIG. 11. As the position to be held, a position at which information printed on the serviceman call printed matter 70 is exposed entirely from the finisher for the user to visually confirm all the information (hereinafter, referred to as the appropriate position) is preferred.

In order to determine this appropriate position, for example, paper position detecting means 82 capable of detecting the position of printed matter may be provided close to the second paper discharge rollers 79. A time needed for the serviceman call printed matter 70 to reach the appropriate position at which it should be held by the second paper discharge rollers 79 since the paper position detecting means 82 detects the start of passing is calculated in advance. According to this time and the passing start detection signal sent from the paper position detecting means 82, the second paper discharge rollers 79 becomes able to hold the serviceman call printed matter 70 at the appropriate position.

Figure 12:
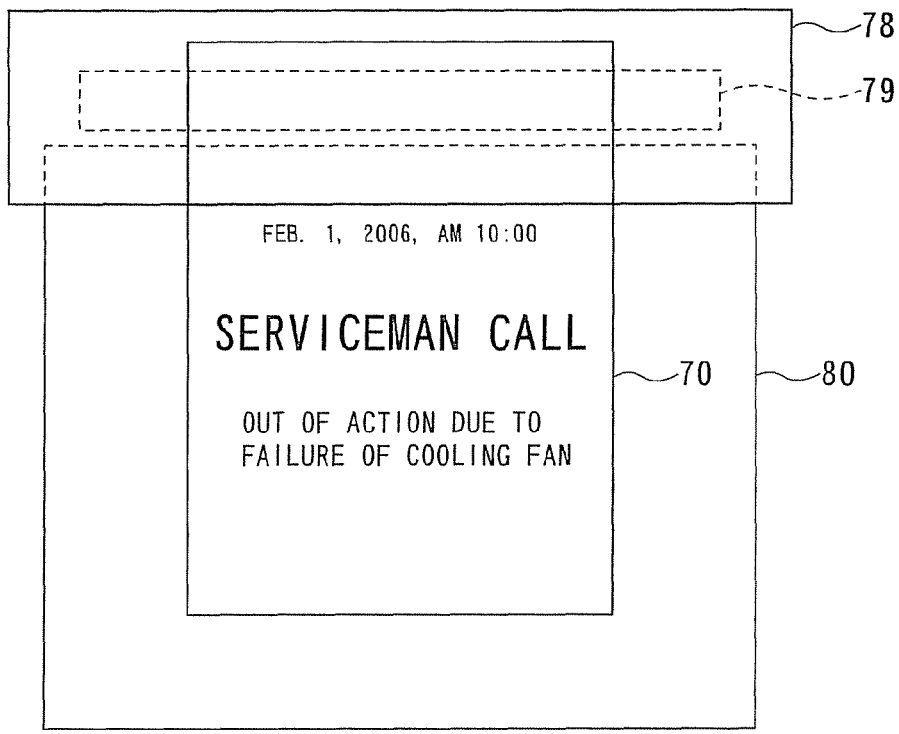
FIG. 12 is an explanatory view showing a condition of the serviceman call printed matter held at an appropriate position by second paper discharge rollers.
Figure 13:
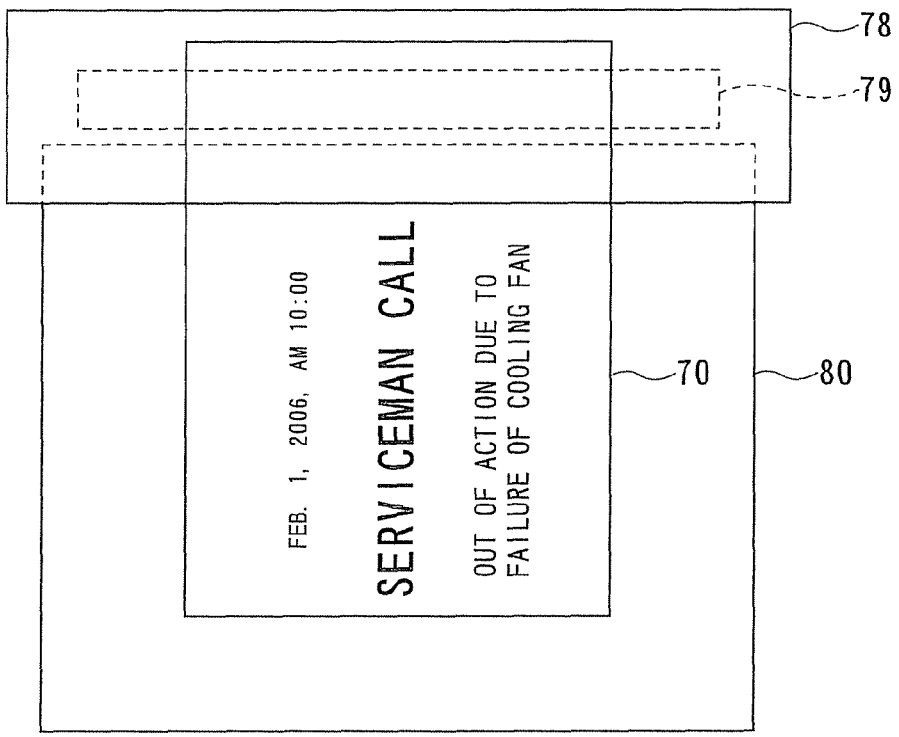
FIG. 13 is an explanatory view showing another condition of the serviceman call printed matter held at another appropriate position by the second paper discharge rollers.

FIG. 12 and FIG. 13 are explanatory views showing the conditions of the serviceman call printed matter 70 held at the appropriate position by the second paper discharge rollers 79. The lower side of the paper surface in both FIG. 12 and FIG. 13 corresponds to the left side of the page of FIG. 11, and the right side of the page of both FIG. 12 and FIG. 13 corresponds to the front side of the page of FIG. 11.

As are shown in FIG. 12 and FIG. 13, by holding the serviceman call printed matter 70 at the appropriate position by the second paper discharge rollers 79, not only is it possible to enable the user to visually confirm all the information printed thereon, but it is also possible to prevent it from being missing due to a wind or the like.

It should be noted that whether it is outputted so that the user can read it properly when he sees it from the left side of the page of FIG. 11 (see FIG. 12) or whether it is outputted so that the user can read it properly when he sees it from the front side of the page of FIG. 11 (see FIG. 13) is a setting that can be determined according to the setting information of the image forming apparatus 10 stored in the NVRAM 25.

Paper used for the serviceman call printing can be paper of any size as long as it is loaded on the paper feeding tray 71. Which size of paper should be used may be determined according to priorities pre-set in the paper feeding tray 71. The setting as to the priority order in the paper feeding tray 71 is a setting that can be determined by the setting information of the image forming apparatus 10 stored in the NVRAM 25.

In a case where the serviceman call printed matter 70 is held at the appropriate position by the second paper discharge rollers 79, the abnormality printing unit 21*b*4 reads out information about the size of paper that should be used and the orientation in which printing should be executed from the setting information stored in the NVRAM 25. According to the foregoing information, the abnormality printing unit 21*b*4 determines the print position and the character size for the information to be printed on the serviceman call printed matter 70 in such a manner that the user is able to visually confirm all the information when held at the appropriate position by the second paper discharge rollers 79, after which printing is executed.

The image forming apparatus 10 of this embodiment stops power supply to the main CPU 21 swiftly under the control of the secondary CPU 41 upon detection of an abnormality in the cooling fan 11 that cools the main CPU 21. It is thus possible to prevent thermal destruction resulting from the self-heating of the main CPU 21.

Also, the image forming apparatus 10 shown in FIG. 1 notifies the user of an abnormality in the cooling fan by outputting printed matter or by means of a display on the LCD 46 before power supply to the main CPU 21 is stopped. The display on the LCD 46 is continued by the secondary CPU 41 even after power supply to the main CPU 21 is stopped. The user is thus able to understand easily an abnormality in the cooling fan 11.

Further, the image forming apparatus 10 shown in FIG. 1 detects an error in the image formation processing unit 12 before power supply to the main CPU 21 is stopped, and displays the absence or presence of an error on the LCD 46. After power supply to the main CPU 21 is stopped, the secondary CPU 41 detects an error in the image forming processing portion 12, so that not only can the absence or presence of an error be displayed on the LCD 46, but also a displayed image on the LCD 46 can be changed by the secondary CPU 41 in a case where the error is removed. It is thus possible to display an image corresponding to error removal processing by the user on the LCD 46 even after power supply to the main CPU 21 is stopped, which offers enhanced convenience to the user.

Furthermore, in the image forming apparatus 10 shown in FIG. 1, power supply to the image forming processing 12 is stopped by the secondary CPU 41 when all the errors in the image formation processing unit 12 have been removed after power supply to the main CPU 21 was stopped. Hence, it is possible to prevent a trouble such that leaves an error, such as paper jamming, possibly occurring when the power supply for the entire image forming apparatus 10 is turned off in the presence of an abnormality in the cooling fan 11. The image forming apparatus 10 shown in FIG. 1 thus becomes able to remove a factor of a failure in advance appropriately. Hence, a longer life can be expected and the industrial value becomes extremely high.

It should be noted that the invention is not limited to the embodiment described above, and in practice, the invention can be implemented by modifying components without deviating from the scope of the invention. In addition, by adequately combining plural components disclosed in the embodiment above, various inventions can be achieved. For example, it is possible to omit some components from all the components disclosed in the embodiment.

What is claimed is:

1. An image forming apparatus, comprising:
a cooling device;
an image formation processing unit;
a main control unit configured to be cooled by the cooling device, and including a main image formation control unit, an abnormality detecting unit, an abnormality information writing unit, an abnormality information determining unit, and a start-up aborting unit, the main image formation control unit configured to control the image formation processing unit, the abnormality detecting unit configured to detect an abnormality in the cooling device, the abnormality information writing unit configured to store information informing a presence of the abnormality in the cooling device into a non-volatile memory when the abnormality detecting unit detects the abnormality in the cooling device, the abnormality information determining unit configured to determine whether the information informing the presence of the abnormality in the cooling device is stored in the non-volatile memory in a case where start-up processing of the image formation processing unit is started as power supply to the main control unit and the image formation processing unit is started, the start-up aborting unit configured to abort the start-up processing of the image formation processing unit in a case where the information informing the presence of the abnormality in the cooling device is stored in the non-volatile memory;

a secondary control unit including a secondary image formation control unit and a power supply control unit, the secondary image formation control unit configured to control the image formation processing unit, the power supply control unit configured to stop power supply to the main control unit in a case where the abnormality detecting unit detects the abnormality in the cooling device; and a changeover unit configured to connect the image formation processing unit to the main image formation control unit in a case where power is supplied to the main control unit and to connect the image formation processing unit to the secondary image formation control unit in a case where the power supply to the main control unit is stopped by the power supply control unit in the secondary control unit.

2. The image forming apparatus according to claim 1, further comprising a display output unit, wherein the main control unit further includes an abnormality display unit configured to display information informing a presence of the abnormality in the cooling device on the display output unit in a case where the abnormality detecting unit detects the abnormality in the cooling device.

3. The image forming apparatus according to claim 1, wherein:

the main control unit further has an abnormality printing unit configured to discharge printed matter on which is printed information informing a presence of the abnormality in the cooling device in a case where the abnormality detecting unit detects the abnormality in the cooling device.

4. The image forming apparatus according to claim 3, further comprising a paper discharge tray, wherein the abnormality printing unit further configured to discharge the printed matter in such a manner that a printed surface of the printed matter is face up on the paper discharge tray, the printed matter on the printed surface of which is printed the information informing the presence of the abnormality in the cooling device.

5. The image forming apparatus according to claim 4, further comprising:

a paper discharging unit configured to discharge the printed matter on which is printed the information informing the presence of the abnormality in the cooling device onto the paper discharge tray, wherein part of the printed matter is held by the paper discharge unit.

6. The image forming apparatus according to claim 5, wherein:

the part of the printed matter is held by the paper discharging unit in such a manner that all the information informing the presence of the abnormality in the cooling device that is printed thereon, is exposed to an outside from the paper discharging unit.

7. The image forming apparatus according to claim 1, further comprising a display output unit, wherein the main image formation control unit further includes:

a processing stopping unit configured to stop processing by the image formation processing unit in a case where the abnormality detecting unit detects an abnormality in the cooling device;

a main error determining unit configured to determine whether there is an error in the image formation processing unit; and a main error notifying unit configured to display, in a case where there is the error in the image formation processing unit, information about the error on the display output unit, and wherein the secondary image formation control unit further includes:

a secondary error determining unit configured to determine whether there is an error in the image formation processing unit; and a secondary error notifying unit configured to display, in the case where there is the error in the image formation processing unit, information about the error on the display output unit.

8. The image forming apparatus according to claim 7, wherein:

the power supply control unit in the secondary control unit stops power supply to the image formation processing unit in a case where the secondary error determining unit determines there is no error in the image formation processing unit.

9. The image forming apparatus according to claim 1, further comprising an operation input unit, wherein the main control unit further includes an information changing unit configured to delete the information informing the presence of the abnormality in the cooling device stored in the non-volatile memory unit when the information changing unit receives information informing that the abnormality in the cooling device is removed from a user via the operation input unit.

10. A method of controlling an image forming apparatus, comprising:

detecting an abnormality in a cooling device;

writing information informing a presence of the abnormality in the cooling device into a non-volatile memory unit;

stopping power supply to a main control unit;

connecting an image formation processing unit to a secondary control unit with disconnecting the main control unit starting start-up processing of the image formation processing unit by starting power supply to the main control unit and the image formation processing unit;

determining whether the information informing the presence of the abnormality in the cooling device is stored in the non-volatile memory unit; and aborting the start-up processing of the image formation processing unit in a case where the information informing the presence of the abnormality in the cooling device is stored in the non-volatile memory unit.

11. The method of controlling an image forming apparatus according to claim 10, further comprising the step of:

displaying information informing a presence of the abnormality in the cooling device on a display output unit,
wherein the step of displaying information is performed after the step of detecting the abnormality.

12. The method of controlling an image forming apparatus according to claim 10, further comprising the step of:
discharging printed matter on which is printed information informing a presence of the abnormality in the cooling device,
wherein the step of discharging printed matter is performed after the step of detecting the abnormality.

13. The method of controlling an image forming apparatus according to claim 12, wherein:
in the step of discharging printed matter, the printed matter is discharged in such a manner that a printed surface of the printed matter is face up.

14. The method of controlling an image forming apparatus according to claim 13, wherein:
part of the printed matter is held by a paper discharge unit.

15. The method of controlling an image forming apparatus according to claim 14, wherein:
the part of the printed matter is held by the paper discharge unit in such a manner that all the information informing the presence of the abnormality in the cooling device and printed thereon will be exposed to an outside from the paper discharge unit.

16. The method of controlling an image forming apparatus according to claim 10, wherein the step of stopping power supply includes the steps of:
stopping processing by the image formation processing unit;
determining whether there is an error in the image formation processing unit;
displaying, in a case where there is the error in the image formation processing unit, information about the error on a display output unit by the main control unit; and
stopping power supply to the main control unit, and
wherein, after the step of connecting the image formation processing unit to a secondary control unit is performed, the method further comprises the steps of:
determining whether there is the error in the image formation processing unit; and
displaying, in a case where there is the error in the image formation processing unit, information about the error on the display output unit by the secondary control unit.

17. The method of controlling an image forming apparatus according to claim 16, further comprising the step of:
stopping power supply to the image formation processing unit in a case where a determination result in the step of determining whether there is the error in the image formation processing unit indicates an absence of the error in the image formation processing unit.

18. The method of controlling an image forming apparatus according to claim 10, further comprising the step of:
deleting the information indicating the presence of the abnormality in the cooling device stored in the non-volatile memory unit, upon receipt of information informing that the abnormality in the cooling device is removed, from a user via an operation input unit.

* * * * *